Nov. 1, 1960 H. LEE 2,958,546
PROTECTIVE COVERING FOR PIPES AND FITTINGS THEREFOR
Filed Dec. 31, 1956 4 Sheets-Sheet 2
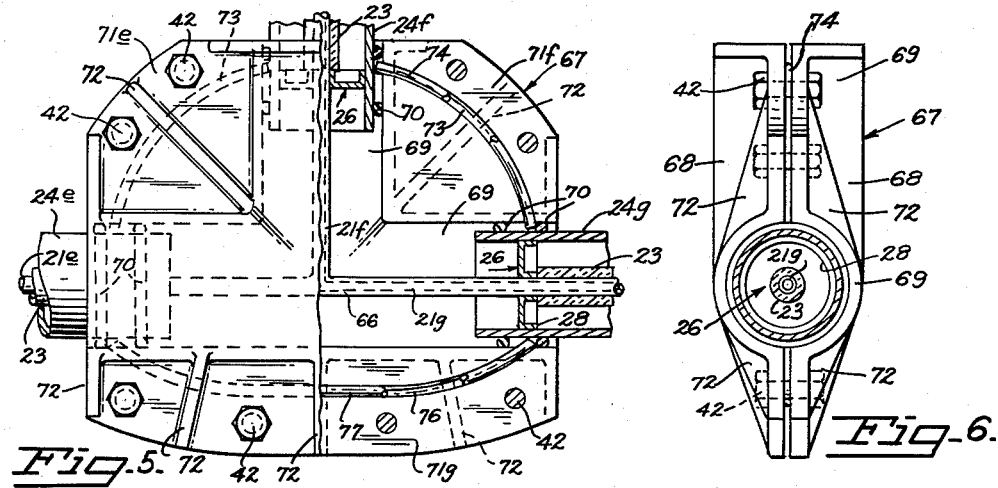
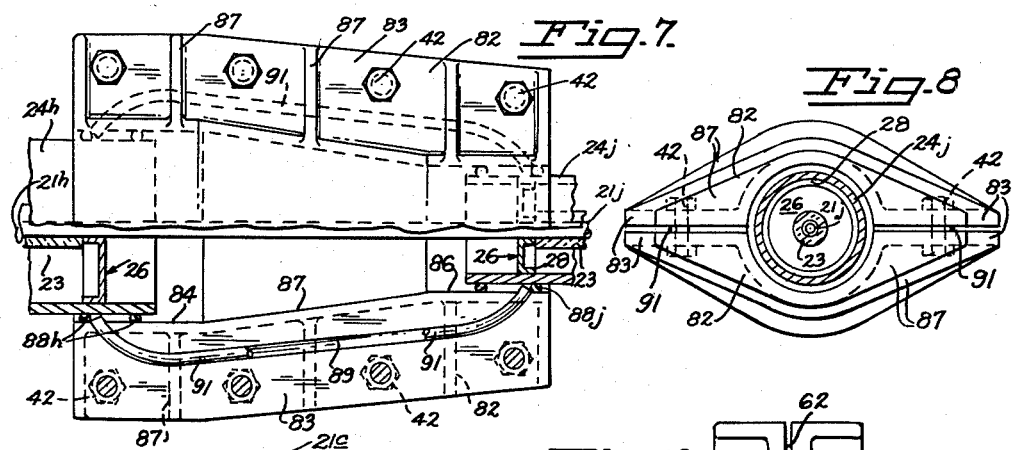
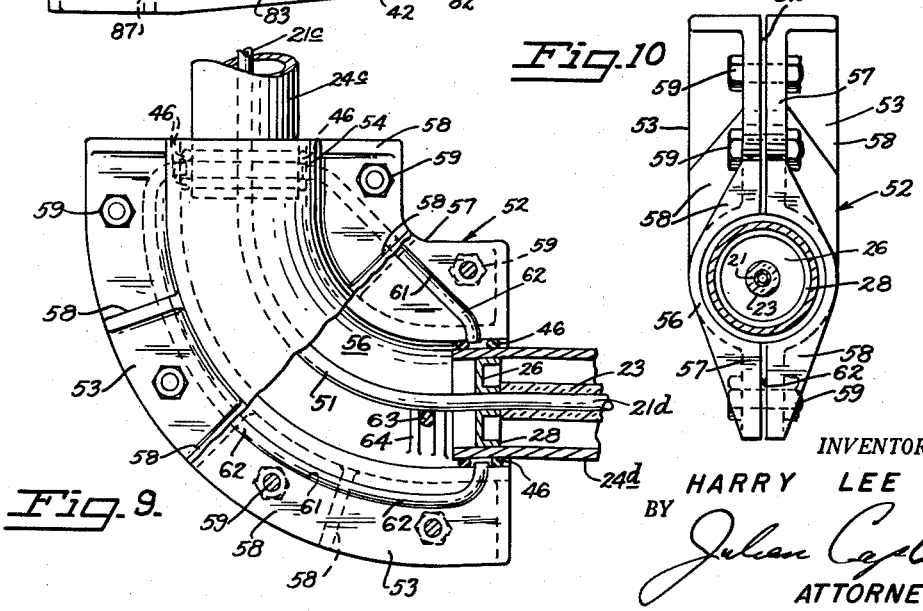
INVENTOR.
HARRY LEE
BY
ATTORNEY Nov. 1, 1960   H. LEE   2,958,546
PROTECTIVE COVERING FOR PIPES AND FITTINGS THEREFOR
Filed Dec. 31, 1956   4 Sheets-Sheet 3
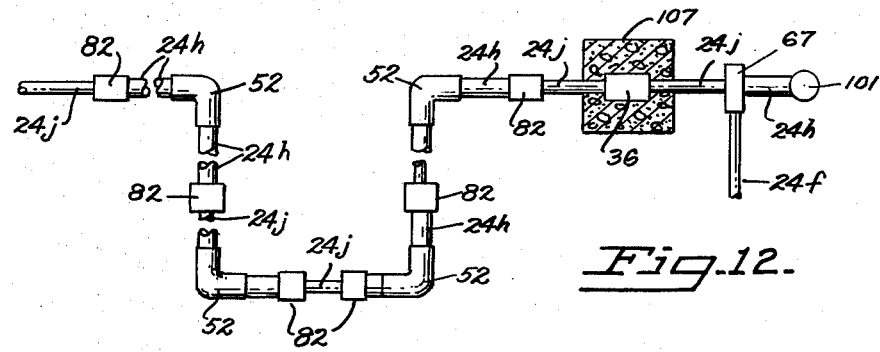
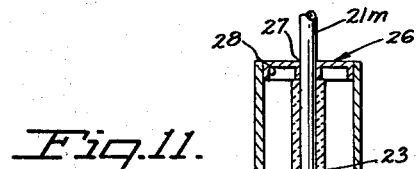
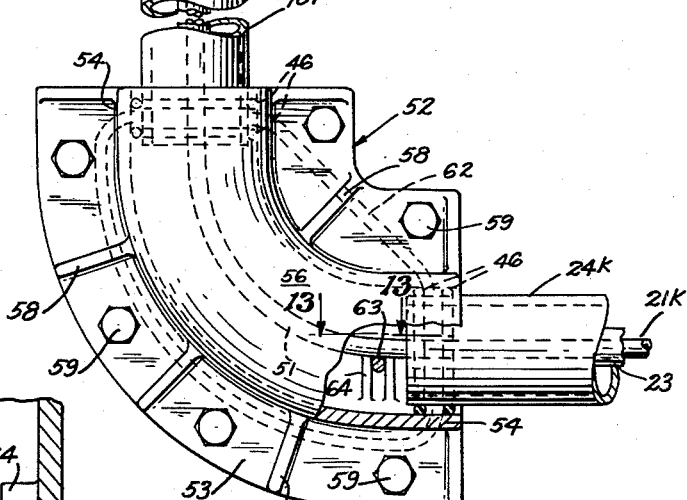
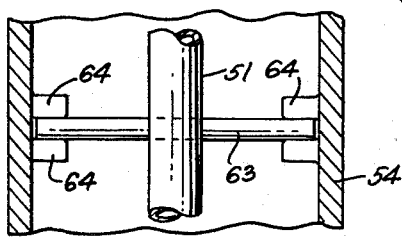
INVENTOR.
HARRY LEE
BY
ATTORNEY Nov. 1, 1960 H. LEE 2,958,546
PROTECTIVE COVERING FOR PIPES AND FITTINGS THEREFOR
Filed Dec. 31, 1956 4 Sheets-Sheet 4
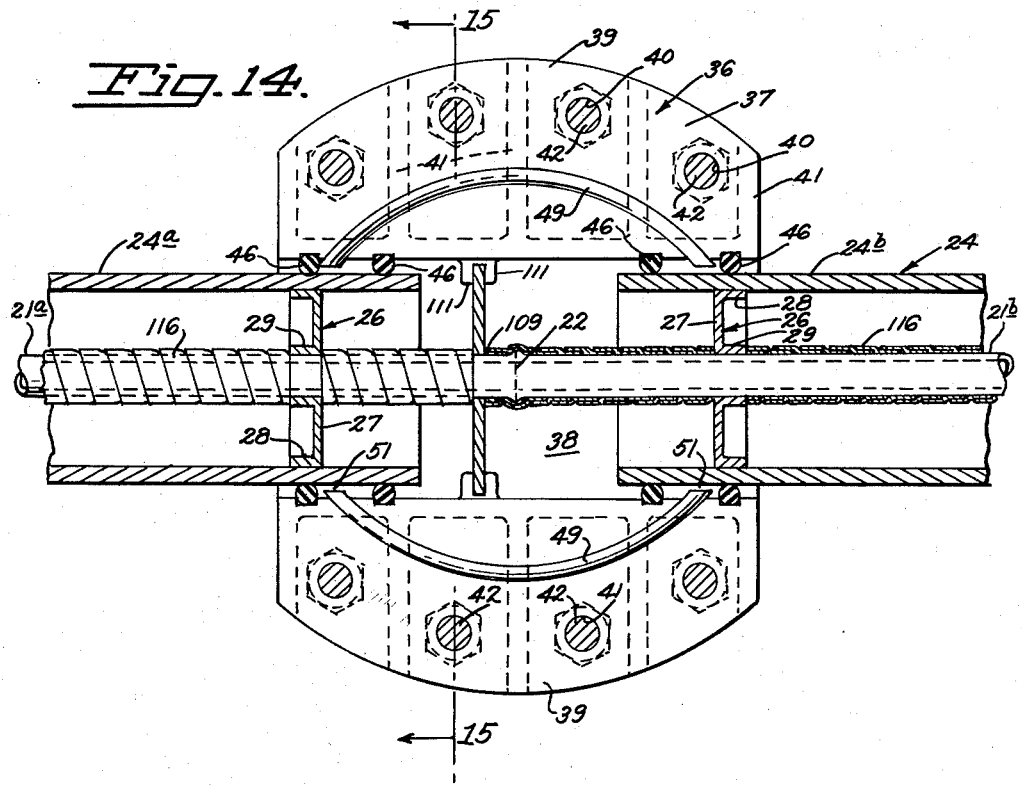
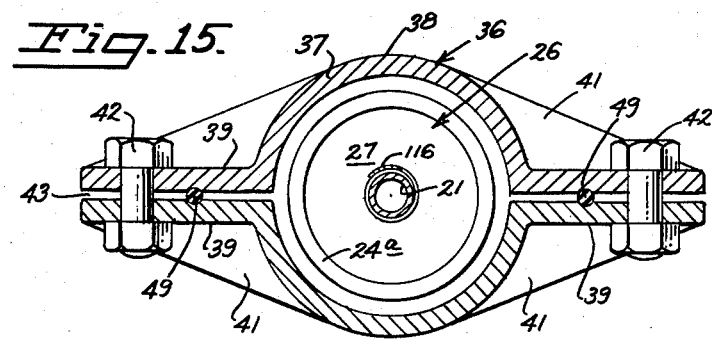
INVENTOR.
HARRY LEE
BY
ATTORNEY

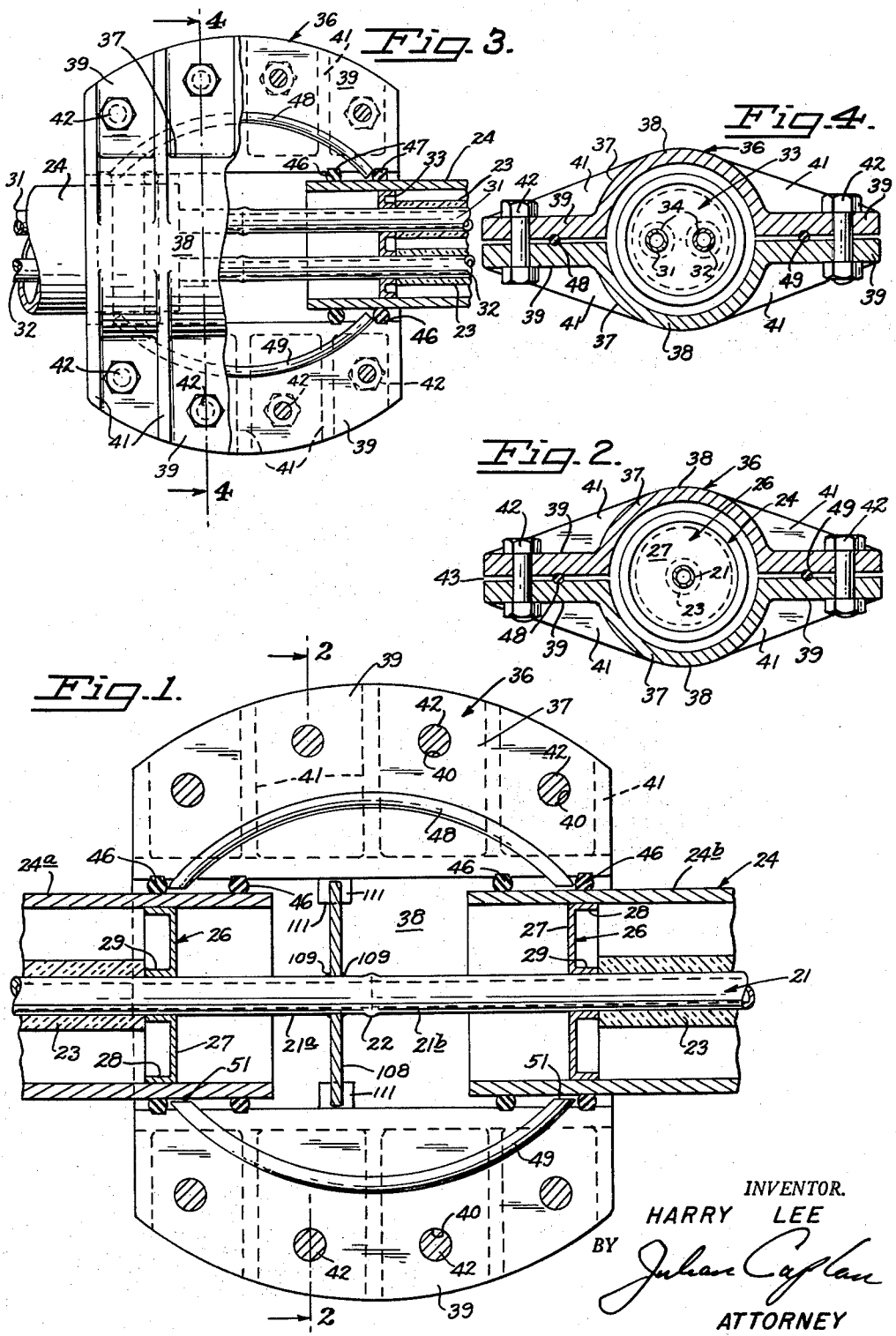

United States Patent Office 2,958,546
Patented Nov. 1, 1960

2,958,546
PROTECTIVE COVERING FOR PIPES AND FITTINGS THEREFOR

Harry Lee, 1345 Rollins Road, Burlingame, Calif.

Filed Dec. 31, 1956, Ser. No. 631,716

2 Claims. (Cl. 285—21)

This invention relates to a new and improved protective covering for pipes and fittings therefor. Reference is made to my copending patent application Serial No. 567,262 filed February 23, 1956, now abandoned, for Protective Covering for Pipes and Fittings Therefor, of which the present application is a continuation in part.

The present invention involves a protective covering for pipes, particularly underground pipes and pipes otherwise located where they are subject to corrosion and deterioration. The present invention has particular application in the protection of underground pipes carrying steam, water, air, gas and other fluids.

There have heretofore been developed a variety of different protective coverings for insulated pipes buried underground. One of the principal disadvantages of such prior constructions is the high cost of installation thereof. Still another disadvantage of such prior constructions is the likelihood that expansion and contraction of the pipe will eventually damage the covering, permitting moisture to enter and corrode the pipe. A still further disadvantage of prior constructions is the likelihood of damage to the protective covering with the passage of time due to shifting of the conduit in the ground. The foregoing and other disadvantages are overcome by the present invention.

One of the principal advantages of the present invention is the fact that the pipe is enclosed in a larger diameter conduit having non-corrosive characteristics. The outer conduit is formed in sections joined together by fittings hereinafter described in detail, in such manner that the leakage of heat and moisture through the fittings is eliminated. At those points in an installation where T's, elbows, reducers and the like are employed, the protective outer conduit is provided with corresponding fittings of a similar, but enlarged shape, which are so constructed and sealed that ingress of moisture and loss of heat through the joint are prevented.

Another feature and advantage of the present invention is the ease with which it may be installed by relatively unskilled labor and without the need of special tools and equipment.

A still further feature of the invention is the provision of fittings which may be employed with a variety of different protective conduits, thereby increasing the versatility of the present invention.

Still another feature of the invention is the fact that the fittings hereinafter described in detail are of such nature that they need not be accurately machined and yet a perfectly watertight and airtight seal is provided which protects the enclosed pipe from atmospheric conditions and heat loss.

A still further feature of the invention is the provision of means for providing heat insulation wherein the internal pipe is covered with a loose spiral wrap of aluminum foil or other highly reflective covering. The use of a highly reflective covering over the pipe eliminates the necessity of evacuating the conduit.

Other objects of the present invention will become apparent upon reading the following specification and referring to the accompanying drawings in which similar characters of reference represent corresponding parts in each of the several views.

In the drawings:

Fig. 1 is a horizontal sectional view through a joint of the pipe and protective conduit employed in this invention;

Fig. 2 is a transverse vertical sectional view in reduced scale taken substantially along the line 2—2 of Fig. 1;

Fig. 3 is a plan, partially broken away in section, of a joint similar to that illustrated in Fig. 1 with two pipes enclosed in the conduit instead of one;

Fig. 4 is a transverse vertical sectional view taken substantially along line 4—4 of Fig. 3;

Fig. 5 is a plan, partially broken away in section, of a T employing the present invention;

Fig. 6 is an end elevation of the structure of Fig. 5 as viewed from the right;

Fig. 7 is a plan, partially broken away in section, of a reducer employing the present invention;

Fig. 8 is an end elevation of the structure of Fig. 7 as viewed from the right;

Fig. 9 is a plan, partially broken away in section, of and elbow employing the present invention;

Fig. 10 is an end elevation of the structure of Fig. 9 as viewed from the right;

Fig. 11 is a front elevation, partially broken away in section, showing an end cap employing the present invention;

Fig. 12 is a schematic plan view of a typical piping diagram showing conduit and fittings employing the present invention at various locations;

Fig. 13 is a plan taken substantially along line 13—13 of Fig. 11;

Fig. 14 is a horizontal sectional view similar to Fig. 1 showing a modified construction; and Fig. 15 is a transverse sectional view taken substantially along line 15—15 of Fig. 14.

The present invention may be used to protect a variety of different pipes 21. As illustrated herein, a conventional steel pipe 21 is shown, it being understood that other types of pipe may be employed. In its simplest form, the present invention is used in connection with two straight sections of pipe 21ᵃ and 21ᵇ joined together in a butt weld 22, it being understood that threaded connections or other joints may be employed. The pipe 21 ordinarily carries a heated or refrigerated medium and hence it is desirable to protect the pipe from heat loss by means of lagging 23 or other insulation of conventional construction. However, as hereinafter appears in greater detail, by reason of the airtight nature of the protective covering which is the subject of this invention, it is possible to evacuate the space between the pipe and its protective conduit, thereby minimizing loss of heat and making insulation unnecessary.

Surrounding pipe 21 is a protective conduit 24 of a non-corrosive material. One material which is particularly suitable for the present invention is a commercially available conduit formed of cement and asbestos fibres. It is desirable that the conduit 24 be relatively inexpensive, water-impervious, airtight, and resistant to reasonable loads and shocks. Paper impregnated conduit, ceramic pipe, cast-iron pipe and a variety of other materials are satisfactory for the fabrication of the conduit. It is desirable that the lengths in which the conduit is available be sufficient to reduce the number of fittings required. Conduit 24 may be installed directly in the ground, as in an earth trench, its non-corrosive characteristics protecting pipe 21, which is ordinarily of a corrodible nature.

In order to support pipe 21 approximately in the center of conduit 24, collars 26 are installed at intervals, Collars 26 are annular sheet metal disks 27 having inturned peripheral flanges 28 which fit immediately inside conduit 24 and likewise having inturned inner flanges 29 which fit around pipe 21. The pipe is ordinarily supported in the center of the conduit. As illustrated in Figs. 3, 4 and 5, in some installations, such as in hot water heating, two pipes 31 and 32 are preferably installed in a single conduit 24. In these instances, collars 33 may be formed with two holes 34 which maintain pipes 31 and 32 in proper parallel relationship adjacent the center of conduit 24.

The adjacent sections of conduit 24$^a$ and 24$^b$ preferably terminate a sufficient distance apart to permit the workman installing the pipe to weld or otherwise form the joint 22 between the adjacent pipe sections 21$^a$ and 21$^b$. After the welded or otherwise joined sections have been tested under pressure, the present invention provides a fitting for the adjacent conduit sections 24$^a$ and 24$^b$. In the simple sleeve fitting 36 shown in Figs. 1 and 2, two aligned conduit sections 24$^a$ and 24$^b$ of the same diameter are fitted together. The fitting comprises two substantially identical, substantially semi-cylindrical sleeves 37. Each sleeve is formed with a substantially semi-cylindrical half-sleeve portion 38 of a radius of curvature slightly greater than the outer radius of conduit 24. The longitudinal edges of semi-cylindrical portion 38 are formed with outwardly extending arcuate flanges 39. Reinforcing gussets 41 are provided to distribute the stress from flanges 39 to semi-cylindrical portion 38 when the two halves of the fitting are drawn together. The flanges 39 are provided with a plurality of bolt holes 40 through which bolts 42 are passed to connect the two halves of the fitting together.

It will be noted that the two halves of the fitting, in assembled positions, are preferably not drawn tightly together, but a gap 43 exists between the two halves. The provision of such gap 43 obviates the necessity of accurately machining the halves of the fitting and also provides a tolerance for minor variations in diameter of conduit and fitting.

Interiorly of fitting 36 and surrounding conduit 24 adjacent the inner end thereof is at least one resilient ring 46 formed of natural or artificial rubber and circular in cross-section. Preferably at least two such rings 46 are installed spaced apart a distance at least equal to their diameters, the two rings 46 preventing loosening of conduit 24 between fitting 36 if it is subjected to stresses. Rings 46 are preferably installed about ¾ of an inch from the inner end of the conduit and a similar distance inside the fitting. To assist in locating rings 46 in proper position, grooves 47 may be cast in the fittings (see Fig. 3), it being understood that the depth of grooves 47 is considerably less than the diameter of rings 46.

To complete the seal at the fitting an arcuate groove 48 is formed on flange 39 terminating approximately midway between the two rings 46. Installed in the arcuate groove is a gasket 49 comprising an arcuate piece of rubber which is initially circular in cross-section. The ends 51 of gasket 49 are beveled so that the beveled ends are substantially parallel and in proximity to the outer wall of conduit 24. Preferably an adhesive is employed to secure gasket 49 in its groove 48 prior to installation.

In use, the sections of pipe 21$^a$ and 21$^b$ are placed in position in the trench with conduit 24 surrounding the same and having a suitable gap between the opposed ends of sections 24$^a$ and 24$^b$ and collars 26 fitting into conduits 24 adjacent their ends to center pipes 21 within the conduits. Collars 26 are preferably spaced in such position that they will subsequently be inside fitting 36 so that the load borne by the collars is transmitted to the fitting. Joint 22 is formed between the two pipe sections 21$^a$ and 21$^b$ by butt welding or other conventional means. Before joint 22 is formed and tested, two rings 46 are placed around the ends of conduit 24 adjacent the ends thereof. One half fitting 37 is provided with rubber gaskets 49 in each groove 48. Two half fittings 37 are then placed around the ends of the conduit 24 and bolts 42 installed and drawn tight. Halves 37 of fitting 36 are sealed to the conduit 24 by means of rings 46 and gaskets 49, all of which are compressed as bolts 42 are drawn tight. A bulging of beveled ends 51 of gasket 49 seals the same against conduit 24 and also against rings 46 and the edges of halves 37 between the termini of the groove 48 and the outer rings 46.

Accordingly, the present invention provides a watertight and airtight seal between the two conduit sections 24. As has been previously indicated, where it is desired to eliminate insulation 23 or to augment the effect of insulation already provided, conduit 24 may be evacuated by means of a vacuum pump, thereby insulating pipe 21 from the surrounding earth.

In place of the simple sleeve fitting illustrated in Figs. 1-4, various other fittings may be employed. As shown in Figs. 9 and 10, an elbow fitting is employed. Pipe sections 21$^c$ and 21$^d$ which are angularly disposed are provided with an elbow fitting 51 which is welded or otherwise joined to the adjacent pipe sections. The conduit sections 24$^c$ and 24$^d$ are terminated a short distance from pipe elbow 51. The fitting 52 comprises two halves 53 which are arcuate in plan and have short cylindrical extensions 54 at either end. The central portion 56 of each half is substantially semicircular in cross-section and is provided with a peripheral flange 57. Gussets 58 are provided to distribute the stress from flanges 57 to semi-cylindrical portions 56. Bolt holes formed in the flanges receive bolts 59 which are used to tighten the two halves 53 together. Rings 46 of resilient material are slipped over the ends of each of conduit sections 24$^c$ and 24$^d$. Grooves 61 are formed in flanges 57 extending from the locations of rings 46 adjacent each end of the fitting and irregularly shaped gaskets 62 are fitted in grooves 61. The ends of gaskets 62 fit against conduits 24$^c$ and 24$^d$. As is evident from the foregoing description and an examination of Figs. 9 and 10, when bolts 59 are drawn together, the two halves 53 of fitting 52 are sealed to conduits 24$^c$ and 24$^d$ and to each other by means of rings 46 and gaskets 62. In order to accommodate expansion and contraction of pipe 21 at fitting 51, the use of collars 26 is preferably omitted. Instead a bar or pipe 63 is supported horizontally in the lower half 53 and pipe section 21$^d$ rests thereupon in such manner that it can move as it expands or contracts. The length of pipe 63 is selected so that pipe 21$^d$ resting thereon is approximately in the center of the conduit 24$^d$. For smaller diameter pipes, longer bars 63 are employed and for larger diameter pipes shorter bars are employed. Bars 63 are held between pairs of lugs 64 cast, welded, or otherwise fixed on the inside of lower fitting 51. The space between lugs 64 of each pair is sufficient to accommodate the bar 63.

In Figs. 5 and 6, a simple T is employed. Pipe sections 21$^e$, 21$^f$ and 21$^g$ are joined to the three arms of pipe T 66 by welding or other means. Conduits 24$^e$, 24$^f$ and 24$^g$ encase the corresponding pipes. Fittings 67 are formed in two halves 68 and are T-shaped in plan and have three arms 69 semicircular in cross-section. Flanges 71$^e$, 71$^f$ and 71$^g$ extend outward from arms 69, as best shown in Fig. 5, and reinforcing gussets 72 are placed at points of greatest stress. Each conduit section 24 is provided with one or more rubber rings 70 which are circular in cross-section. Quadrant-shaped grooves 73 receiving gaskets 74 are formed in flanges 71$^e$ and 71$^f$ between arms 66 which are disposed 90° apart. Elongated grooves 76 receiving gaskets 77 are located in straight flanges 71$^g$.

Still another fitting is a reducer, illustrated in Figs. 7 and 8, to enclose pipe sections 21$^h$ and 21$^j$ surrounded by two conduit sections 24ʰ and 24ʲ of different diameters. Reducer fitting sections 82 have a central portion which is semi-cylindrical in cross-section with edge flanges 83. The central portion has a short cylindrical section 84 to enclose large diameter conduit 24ʰ, a short cylindrical section 86 of leser diameter than section 84 to enclose smaller diameter conduit 24ʲ and an intermediate tapered section 87 joining sections 84 and 86. Gussets 87 reinforce flanges 83 as shown. Each conduit carries a pair of rings 88ʰ or 88ʲ at its end and flanges 83 are formed with longitudinally extending, irregular shaped grooves 89 carrying gaskets 91 conforming to the shape of the grooves. The ends of gaskets 91 are located between rings 88 at each end so that when flanges 83 are drawn together by bolts 42, a seal is effected.

At locations such as where pipe 21 leaves the ground and extends to an area where it is not subjected to corrosive or other adverse conditions, a cap fitting 101 is provided. Fitting 101 is preferably of steel or other material which will satisfactorily weld. As shown in Fig. 11, an elbow fitting 52 which is similar to that shown in Figs. 9 and 10 is employed to join conduit section 24ᵏ to cap fitting 101, these conduits being employed to enclose horizontal pipe 21ᵏ, vertical pipe 21ᵐ and wide radius elbow 51. It will be understood, however, that in place of elbow fitting 52, other styles of fittings may be employed, depending upon the necessary directions which are assumed by the various pipes and conduits employed. The upper end of cap fitting 101 is provided with a collar 26 similar to the collars heretofore described. A circular weld 27 is formed at the juncture of collar 26 with pipe 21 and another large diameter circular weld 28 is formed at the periphery of collar 26 with fitting 101. The hereinbefore described structure seals the conduit system from the atmosphere so that the entire conduit is water and airtight.

Accordingly this invention is applicable to a wide variety of problems encountered in conventional piping installations, particularly below ground. The piping diagram shown in Fig. 12 illustrates how sleeve 36, elbows 52, T 67, reducers 82 and cap 101 are installed in a piping system. It will be understood, however, that the type and variety of the fittings may vary, depending upon the necessities of the particular job.

It is customary in piping installations to anchor the system at one or more central locations so that expansion and contraction may be estimated from a fixed point of reference. Accordingly, the lower half of sleeve fitting 36, as shown in Fig. 12, is embedded in a large concrete block 107 which is of such mass and is so located in the ground that it may be considered immovable. As illustrated in Fig. 1, a circular steel plate 108 having a circular aperture is positioned inside fitting 36 and pipe 21 is welded to plate 108 where it passes through the aperture, as indicated by reference numeral 109. Plate 108 is held against longitudinal movement by a pair of ring-like projections 111 cast or otherwise formed on the inside of sleeve sections 38 on opposite sides of plate 108. It will be understood that different means may be employed to hold plate 108 against movement. The means herein illustrated restrains longitudinal movement of pipe 21 and hence effectually anchors the piping system.

Essentially the invention comprises a protective conduit 24 and fittings for pipes 21 which would otherwise be corrodible. Conduit 24, which encloses the various pipes and pipe fittings employed, is of a non-corrodible character and is also water and airtight. The fittings employed to join the conduit sections together are split in two parts which can be drawn together with bolts or other fastening means. Resilient rings surround the ends of the conduits where they enter the fittings. The flanges of the fittings are grooved and provided with resilient gaskets which seal the two halves of the fittings together and also seal against the conduits. Accordingly the fittings preserve the water and airtight character of the conduit system.

In the modification shown in Figs. 14 and 15, there is provided two straight sections of pipe 21a and 21b joined together in a butt weld 22, it being understood that threaded connections or other joints may be employed. The pipe 21a and 21b may be covered with lagging (not shown) as shown in the modification of Fig. 1 and either the lagging or the pipe itself is covered with a material providing a highly reflective surface. As illustrated in Fig. 14 a spiral wrap 116 of aluminum or tinfoil is applied loosely around pipes 21a and 21b. This wrapping 116 protects the pipe from heat loss by radiation and when used in ordinary installations where the heat differential between the pipe and the atmosphere on earth in which the conduit is buried is not excessive, eliminates the necessity of evacuating the conduit. In all other respects the modification shown in Figs. 14 and 15 is similar to that shown in Figs. 1 and 2 and corresponding reference numerals are applied.

It will be understood that instead of the spiral wrap 116 shown in Figs. 14 and 15, the exterior of pipes 21a and 21b may be painted by spraying or the like with a reflective paint, such as aluminum paint. It will further be understood that whereas Figs. 14 and 15 illustrate a straight joint between two pipe sections 21a and 21b, nevertheless, the same principle of covering with a material forming a reflective surface may be applied to T's, as shown in Fig. 5, reducers as shown in Fig. 7, or elbows as shown in Fig. 9, or other shapes.

Although the foregoing invention has been described in some detail by way of illustration and example for purposes of clarity of understanding, it is understood that certain changes and modifications may be practiced within the spirit of the invention and scope of the appended claims.

I claim:

1. A protective covering for pipes comprising a first conduit, a second conduit spaced longitudinally from said first conduit, said conduits being water-impervious, the adjacent ends of said conduits being spaced from each other a sufficient distance to provide access by a workman between said conduits, a pair of fitting sections surrounding the ends of and bridging the space between said conduits, said fitting sections parting along a plane substantially parallel to the direction of one of said conduits, tightening means for drawing said fitting sections together, said sections each being formed adjacent said conduits with substantially semi-cylindrical sleeves of an internal radius slightly greater than the external radius of the adjacent conduit, a first sealing ring around each said conduit and sealing against said sleeve, a second sealing ring around each said conduit and sealing against said sleeve, said sealing rings being spaced apart longitudinally of said conduit a distance at least as great as the diameter of said rings, said rings being continuous, and gaskets lying in said parting plane, the ends of said gaskets extending into the spaces between adjacent rings, said gaskets under stress of said tightening means deforming to contact and seal against both said conduits and at least one of said rings at each end of said gaskets.

2. In a piping system, a first pipe, a second pipe connected to said first pipe at a joint, a first conduit surrounding said first pipe, a second conduit surrounding said second pipe, the adjacent ends of said conduits being spaced apart to provide sufficient access for a workman to form said joint, said conduits being water impervious, a plurality of fitting sections surrounding the ends of and bridging the space between said conduits, said fitting sections parting along at least one plane substantially parallel to the direction of one of said conduits, said sections each being formed adjacent said conduits with substantially cylindrically shaped sleeves of an internal radius slightly greater than the external radius of the adjacent conduit, a first sealing ring around each said conduit and sealing against said sleeve, a second sealing ring around each said conduit and sealing against said sleeve, said sealing rings being spaced apart longitudinally of said conduit a distance at least as great as the diameter of said rings, said rings being continuous, and gaskets between said sections and sealing said sections together, said gaskets lying in said parting planes, the ends of said gaskets extending into the space between adjacent rings, said gaskets under stress of said tightening means deforming to contact and seal against both said conduits and at least one of said rings on each conduit.

References Cited in the file of this patent

UNITED STATES PATENTS

| | | |
|---|---|---|
| 732,400 | Dresser et al. | June 30, 1903 |
| 1,129,615 | Sykes | Feb. 23, 1915 |
| 1,140,633 | Trucano | May 25, 1915 |
| 1,940,729 | Pfefferle | Dec. 26, 1933 |
| 2,047,778 | Hayden | July 14, 1936 |
| 2,658,527 | Kaiser | Nov. 10, 1953 |